(12) United States Patent
Nagano et al.

(10) Patent No.: US 12,417,381 B2
(45) Date of Patent: Sep. 16, 2025

(54) ALTERNATIVE SOFT LABEL GENERATION

(71) Applicant: International Business Machines Corporation, Armonk, NY (US)

(72) Inventors: Toru Nagano, Taito-ku (JP); Takashi Fukuda, Tokyo (JP); Gakuto Kurata, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 17/118,139

(22) Filed: Dec. 10, 2020

(65) Prior Publication Data

US 2022/0188622 A1 Jun. 16, 2022

(51) Int. Cl.
| | |
|---|---|
| G06N 3/08 | (2023.01) |
| G06F 18/214 | (2023.01) |
| G06N 5/02 | (2023.01) |
| G10L 15/02 | (2006.01) |
| G10L 15/16 | (2006.01) |

(52) U.S. Cl.
CPC ............ *G06N 3/08* (2013.01); *G06F 18/214* (2023.01); *G06N 5/02* (2013.01); *G10L 15/02* (2013.01); *G10L 15/16* (2013.01); *G10L 2015/025* (2013.01)

(58) Field of Classification Search
CPC .......... G06N 3/08; G06N 5/02; G06F 18/214; G06F 18/213; G10L 15/02; G10L 15/16; G10L 2015/025
See application file for complete search history.

(56) References Cited

U.S. PATENT DOCUMENTS

| | | | |
|---|---|---|---|
| 11,367,020 B2 | 6/2022 | Masuzaki et al. | |
| 2017/0032244 A1 | 2/2017 | Kurata | |
| 2019/0205748 A1* | 7/2019 | Fukuda | G06N 3/044 |
| 2020/0167677 A1 | 5/2020 | Verma | |
| 2020/0175961 A1* | 6/2020 | Thomson | G10L 15/28 |

FOREIGN PATENT DOCUMENTS

| | | |
|---|---|---|
| CN | 110459208 A | 11/2019 |
| CN | 110852426 A | 2/2020 |
| CN | 116601648 A | 8/2023 |

(Continued)

OTHER PUBLICATIONS

Alokaili, Areej, Nikolaos Aletras, and Mark Stevenson. "Automatic generation of topic labels." Proceedings of the 43rd international ACM SIGIR conference on research and development in information retrieval. 2020. (Year: 2020).*

(Continued)

*Primary Examiner* — Kevin W Figueroa
(74) *Attorney, Agent, or Firm* — CHIP LAW GROUP (57) ABSTRACT

An approach to identifying alternate soft labels for training a student model may be provided. A teaching model may generate a soft label for a labeled training data. The training data can be an acoustic file for speech or a spoken natural language. A pool of soft labels previously generated by teacher models can be searched at the label level to identify soft labels that are similar to the generated soft label. The similar soft labels can have similar length or sequence at the word phoneme, and/or state level. The identified similar soft labels can be used in conjunction with the generated soft label to train a student model.

16 Claims, 6 Drawing Sheets

(56) References Cited

FOREIGN PATENT DOCUMENTS

| | | |
|---|---|---|
| DE | 112021005230 T5 | 8/2023 |
| GB | 2617729 A | 10/2023 |
| JP | 2020-038343 A | 3/2020 |
| JP | 2023-552711 A | 12/2023 |
| WO | 2020/194716 A1 | 10/2020 |
| WO | 2022/121684 A1 | 6/2022 |

OTHER PUBLICATIONS

International Search Report and Written Opinion, International Application No. PCT/CN2021/132681, International Filing Date Nov. 24, 2021.

Asami et al., "Domain Adaptation of DNN Acoustic Models Using Knowledge Distillation", ICASSP 2017, pp. 5185-5189.

Fukuda et al., "Efficient Knowledge Distillation from an Ensemble of Teachers", INTERSPEECH 2017, Aug. 20-24, 2017, Stockholm, Sweden, pp. 3697-3701, <http://dx.doi.org/10.21437/Interspeech.2017-614>.

Heo et al., "Acoustic scene classification using teacher-student learning with soft-labels", INTERSPEECH 2019, Sep. 15-19, 2019, Graz, Austria, 6 pages, <http://dx.doi.org/10.21437/Interspeech.2019-1989>.

Mell et al., "The NIST Definition of Cloud Computing", Recommendations of the National Institute of Standards and Technology, Special Publication 800-145, Sep. 2011, 7 pages.

Price et al., "Wise teachers train better DNN acoustic models", EURASIP Journal on Audio, Speech, and Music Processing (2016) 2016:10, DOI 10.1186/s13636-016-0088-7, 20 pages.

Japan Patent Office, "Notice of Reasons For Refusal" Apr. 1, 2025, 06 Pages, JP Application No. 2023-530760.

\* cited by examiner

ALTERNATIVE SOFT LABEL GENERATION

BACKGROUND OF THE INVENTION

The present invention relates generally to the field of machine learning, more specifically, training student models via knowledge distillation.

Training a machine learning model requires large datasets and numerous computational resources. Knowledge distillation techniques that attempt to transfer knowledge from complicated teacher networks to a simple student network is used for training machine learning models. The student network is trained on the soft outputs of teachers that minimizes the differences between the student and teacher distributions. Student model training was realized by using the degraded feature as input and the soft targets for the better feature from the teacher network as target. Such approaches require additional parallel data to improve their accuracy on student networks.

SUMMARY

Embodiments of the present disclosure include a computer-implemented method, computer program product, and a system for training a student acoustic model. Embodiments may include receiving a labeled acoustic feature. Additionally, embodiments may include generating a soft label for the labeled acoustic feature by a teacher model. The embodiments may further include extracting by the one or more processors, a second soft label similar to the first soft label from a soft label pool. Finally, embodiments may include training a student model using the first soft label and second soft label.

The above summary is not intended to describe each illustrated embodiment of every implementation of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted allow for generating soft label training data for a student model based on the generation of training data by a teacher model. Complex acoustic models cannot be deployed for real time decoding of streaming speech data. This is primarily due to constraints associated with a lack of computational resources on devices such as smartphones, tablets, and laptops. Another factor associated with difficulty deploying complex acoustic models are latency issues, if a device is attempting to transmit the data to a model located on a server over a network. In an attempt to circumvent the computational and latency issues of complex acoustic models, compact acoustic models have been trained via knowledge distillation techniques. Compact acoustic models lack the layers or analytical power associated with complex or wideband acoustic models. However, this allows for faster feedback and lower computational resource requirements. In an attempt to boost the performance of compact acoustic model outputs, training data from complex models is distilled down, allowing for more information to be contained in the layers of compact acoustic models.

In speech recognition, a neural network (NN) model is typically used for an acoustic model to produce a probability distribution over Hidden Markov Model (HMM) states from acoustic features that are derived from a speech (audio) signal. The HMM states may correspond to clusters of context-dependent phoneme states, or simply context-independent phoneme states. One of the context dependent models is a quinphone model where each distinct phone model for every different two left and two right phone contexts is used.

There are, for example, 44 phonemes in English. By considering phonemes before and after center phonemes with parameter sharing, there are thousands to several tens of thousands context-dependent phoneme states for typical speech recognition system. The neural network model for the acoustic model typically includes an input layer that receives acoustic features derived from a speech signal; one or more hidden layers that processes the acoustic features; and an output layer that outputs a probability distribution over HMM states based on activations of the hidden layers.

Figure 1:
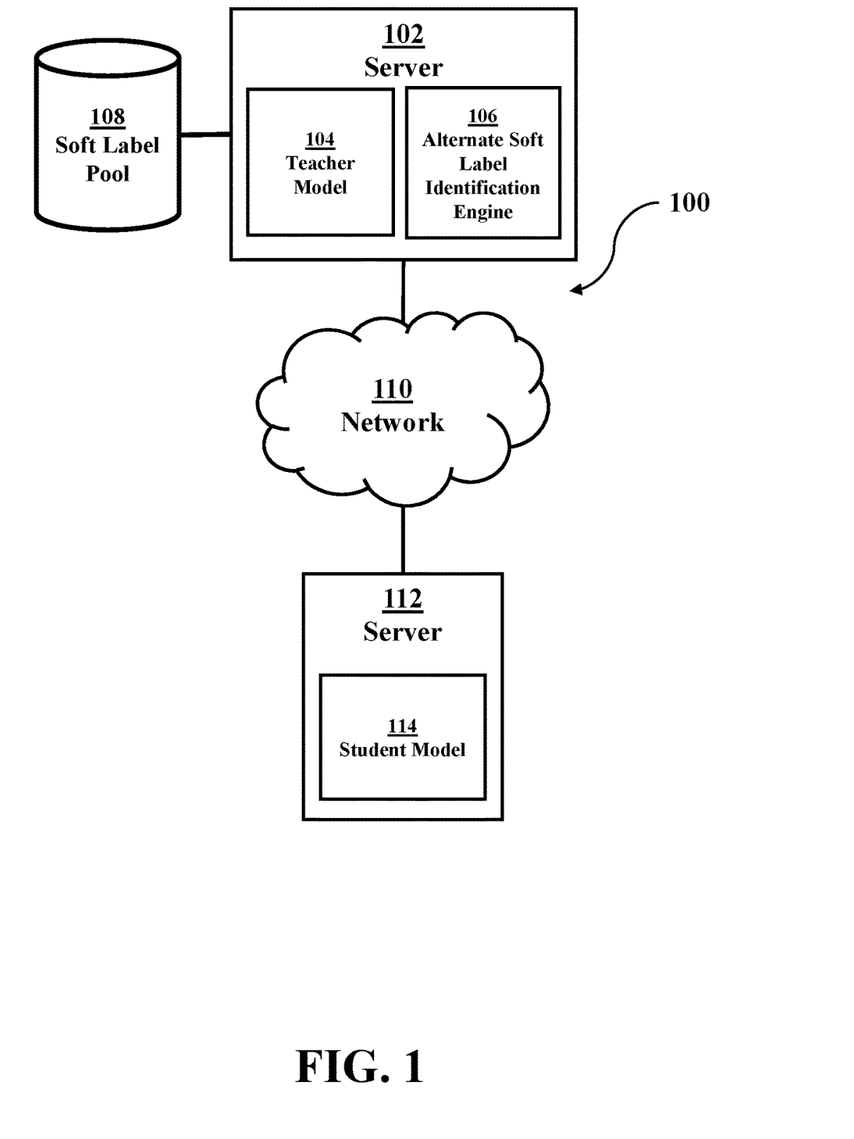
FIG. 1 is a functional block diagram generally a soft label generation environment, in accordance with an embodiment of the present invention.

FIG. 1 is a functional block diagram depicting a soft label generation environment 100. Soft label generation environment 100 comprises teacher model 104 and alternative soft label identification engine 106 operational on server 102, soft label pool 108 stored on server 102, student model 114 operational on server 112, and network 110.

Servers 102 and 112 can be a standalone computing device, a management server, a web server, a mobile computing device, or any other electronic device or computing system capable of receiving, sending, and processing data. In other embodiments, servers 102 and 112 can represent a server computing system utilizing multiple computers as a server system. In another embodiment, servers 102 and 112 can be a laptop computer, a tablet computer, a netbook computer, a personal computer, a desktop computer, or any programmable electronic device capable of communicating with other computing devices (not shown) within soft label generation environment 100 via network 110.

In another embodiment, servers 102 and 112 represents a computing system utilizing clustered computers and components (e.g., database server computers, application server computers, etc.) that can act as a single pool of seamless resources when accessed within soft label generation environment 100. Servers 102 and 112 can include internal and external hardware components, as depicted and described in further detail with respect to FIG. 4. It should be noted, while only servers 102 and 112 are shown in FIG. 1, multiple computing devices can be present within soft label generation environment 100. For example, a client computer (not shown) may be in communication with servers 102 and 112 via network 110. In another example, servers 102 and 112 can be a part of a cloud server network in which a computing device (not shown) connected to network 110 can access servers 102 and 112 (e.g. the internet).

The teacher model 104 is typically a high resource classification model, which contains a single model or an ensemble of plural models. The teacher model 104 may even have resources that are too heavy to actually deploy as practical service. The single classification model or each classification model in the ensemble may be any one of standard neural networks, which includes DNN (Deep Neural Network), CNN (Convolutional Neural Network), RNN (Recurrent Neural Network) based models and a neural network model combining features of several neural network types. In a particular embodiment, the teacher model 104 includes, but not limited to, a VGG model, a long short-term Memory (LSTM) and/or a ResNet. In the described embodiment, teacher model 104 has already been trained using a sufficiently large collection of training data before the knowledge distillation. It should be noted, teacher model 104 can be configured to classify labeled acoustic featured in one or more classes. the soft label can be a prediction of the probability in which an acoustic feature will be in a specific class. Additionally, in some embodiments, teacher model 104 can generate hard features for a labeled acoustic feature. A hard label is a yes or no classification of whether an input acoustic feature is in the class. A soft label is a prediction (i.e., the probability) which an input acoustic feature will be within a class.

Alternate soft label identification engine 106 is a computer module that can be configured to identify one or more soft labels within soft label pool 108, that are similar to a reference label output by teacher model 104. Alternate soft label identification engine 106 can search the reference labels generated by a trained teacher model. Further, in some embodiments, alternate soft label identification engine 106 can identify candidate similar soft labels based on the phonemes associated with the reference label within soft label pool 108. It should be noted, the teacher model that generates the soft labels in soft label pool 108 can be a different teacher model than teacher model 104 within soft label generation environment 100. Alternate soft label identification engine 106 can also, extract a similarity score from candidate soft labels to generate alternate soft labels for training student model 114. Alternate soft label identification engine 106 can send the generated soft labels to student model 114, via network 110.

The soft label pool 108 is configured to store a collection soft labels labeled to respective frames in speech data and a reference label. In the exemplary embodiment, data unit is a frame in the speech data. The speech data collected to generate the soft label may include any speech data that records actual utterances spoken in conversation, narration, etc. Each soft label within the soft label pool may include a phoneme class that is aligned by forced alignment to a corresponding frame from the teacher model 104. In the other words, each frame has been parallelly labeled in advance with a correct phoneme class that is selected from among the teacher side class set. The soft label pool 108 is provided by a data storage or memory area of any storage medium or devices operably coupled to alternate soft label identification engine 106 that implements alternative soft label generation for knowledge distillation to the student model.

Network 110 can be a local area network (LAN), a wide area network (WAN) such as the Internet, or a combination of the two, and can include wired, wireless, or fiber optic connections. In general, network 110 can be any combination of connections and protocols that will support communications between servers 102, 112, and other computing devices (not shown).

The student model 114 is typically a lightweight compact classification model that can be easily used as a production acoustic model. The student model 114 may be any one of standard neural networks, which includes DNN, CNN, RNN based models and a neural network combining features of several neural network types. In one or more embodiments, the student model 114 has a different structure from the teacher model 104. In the exemplary embodiment, the student model 114 is smaller and simpler than the teacher model 104 (i.e., less parameters). However, a model larger and/or more complex than the teacher model 104 may not be excluded from the models for the student model 114. It should be noted, student model 114 may be trained in the same class as teacher model 104. Student model 114 can also be trained in multiple classes and receive training data from multiple teacher models (not shown).

Figure 2:
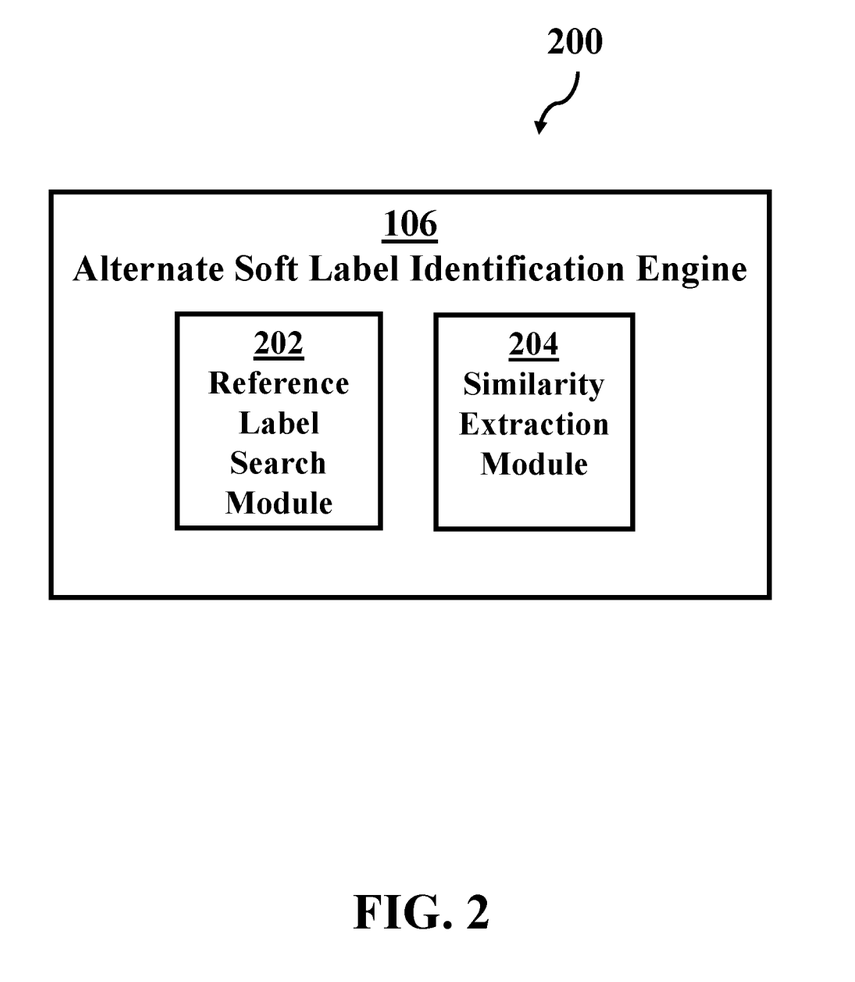
FIG. 2 is a functional block diagram depicting an alternate soft label identification engine, in accordance with an embodiment of the present invention.

FIG. 2 is a functional block diagram 200 depicting an alternate soft label identification engine, in accordance with an embodiment of the present invention.

Shown in FIG. 2 is alternate soft label identification engine 106. Operational on alternate soft label identification engine 106 is reference label search module 202 and similarity extraction module 204.

Reference label search module 202 is a computer module that can be configured to identify candidate soft labels based from soft label pool 108 based on the reference labels associated with the soft labels within soft label pool 108. In some embodiments, reference label search module 202 can receive data associated with a soft label output by teacher module 104. The data can include a reference of the identified speech or utterance. For example, the reference label of a soft label from teacher model 104 can be "I have a question", with the target of "question." Reference label search module 202 can search through all of the reference labels associated with soft labels in soft label pool 108 to find candidate soft labels. In the immediately example above, reference label search module 202, identifies the following from soft label pool 108: " . . . good question . . . ", " . . . your question . . . ", and " . . . two questions . . . ". Candidate soft labels with "question" in the reference label can be sent to alternate soft label identification engine 106. It should be noted, reference labels can be the generated transcription of an audio file containing an utterance, in which an automatic speech recognition system has processed the audio file. In some embodiments, reference labels can be human annotated transcriptions of the contents of an audio file.

Similarity extraction module 204 is a computer module that can be configured to identify similar soft labels from candidate soft labels identified by reference label search module 202. Similarity extraction module 204 can identify similar soft labels based on an analysis of the data within the speech data for the soft label. In some embodiments, similarity extraction module 204 extract a word sequence of similar length at the word, phoneme, or state level. In another embodiment, similarity extraction module 204 can extract a word of the same or similar sequence at the word phoneme or state level. In another embodiments, similarity extraction module 204 can identify a phoneme sequence of the same or similar length at the phoneme or state level. In some embodiments, similarity extraction module 204 can be configured to generate a similarity score for candidate soft labels, based on a variety of factors (e.g., exact match of word/phoneme/state, gender, age, speaker's attributes, etc.) It should be noted, similarity extraction module 204 can be configured to force align transcriptions from soft label pool 108. The force aligned transcriptions can then be aligned to the audio files, where similarity extraction module 204 can further process a spectrogram of the audio file. In an embodiment, similarity extraction module 204 analyzes linguistic similarities. If the target word is "question", similarity extraction module 204 selects the utterance region "question" which has the same or similar duration from soft label pool 208. For the word "question" in the target domain. For example at the word level similarity extraction module 204 would search soft label pool 208 for "question(24)", at the phone level, similarity extraction module 204 would search soft label pool 208 for "K(3)-W(3)-EH(4)-S(3)-CH(5)-IH(3)-N(3)", and at the state level, similarity extraction module 204 would search for "K(1-1-1)-W(1-1-1)-EH(1-2-1)-S(1-1-1)-CH(1-3-1)-IH(1-1-1)-N(1-1-1)." It should be noted, the acoustic features for "question" from the target domain, the original soft label for "question", and the alternative soft label for "question" from the selected utterance regions are used to train the student model.

In another example, in an embodiment where similarity extraction module 204 analyzes the word sequence for similar length, the input for the teacher generated soft label could be "question" in "I have a question." From soft label pool 108 the candidate soft labels and data for the following two word segments have been identified from the reference labels: " . . . that's two questions, sir" and " . . . very good question." Similarity extraction module 204 would recognize the one of the candidate segments ends with the word "question" in one of the, while one of the candidate segments has four words in it like the input segment. In the example, similarity extraction module 204 has been configured to generate a similarity score for the candidate soft labels. The similarity score for " . . . very good question" is 96%, while the similarity score for " . . . that's two questions, sir" is 70%. In this example configuration only candidate soft labels with scores about 83% are sent to student model 114 for training.

In additional embodiments, if similarity extraction model 204 determines one or more candidate soft labels are similar to the soft label generated by teacher model 104, similarity extraction model can further extract similar soft labels from the determined candidate soft labels. In an embodiment, similarity extraction model 204 can send all the matched soft labels to student model 114 for training. In another embodiment, similarity extraction model can send only the closest match (e.g. 1-best) or the n-best soft (where n—is a positive integer) labels to student model 114 for training. In yet another embodiment, similarity extraction model 204 can send the soft labels with high kurtosis distribution to train student model 114.

Figure 3:
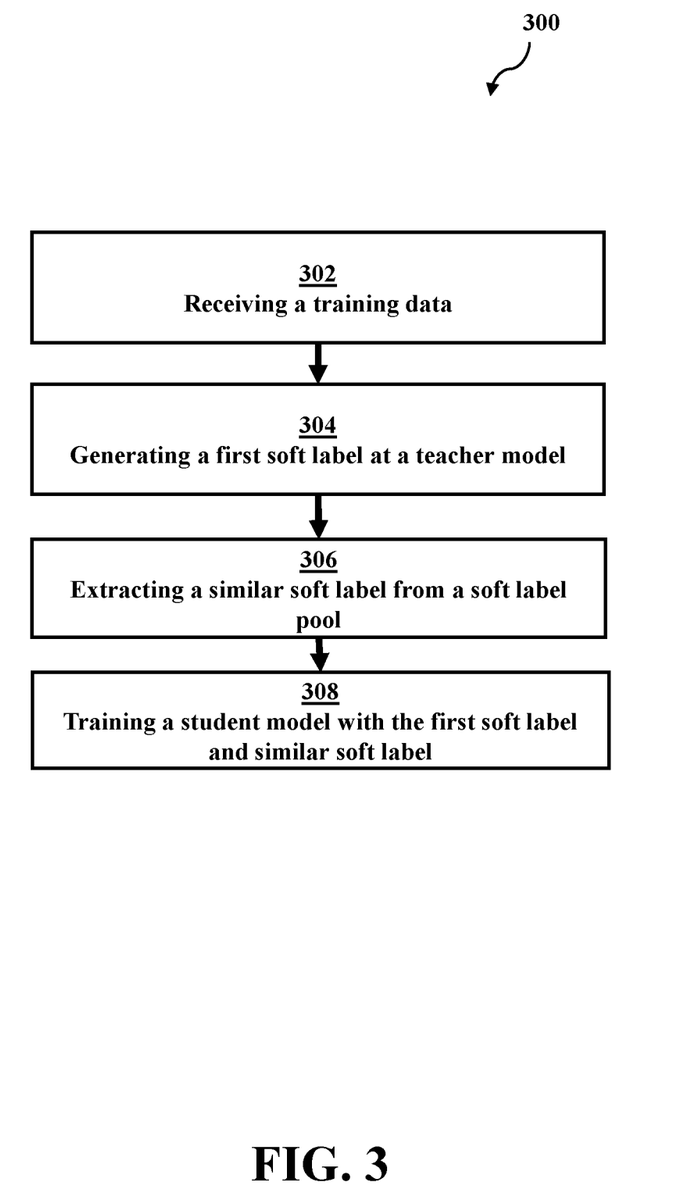
FIG. 3 is a flowchart depicting method for alternate soft label generation, in accordance with an embodiment of the present invention.

FIG. 3 is a flowchart depicting method 300 for alternate soft label generation, in accordance with an embodiment of the present invention. At step 302, a training data is received at teacher model 104. In some embodiments, a training data is an audio file from a user or database. In some embodiments, the training data is labeled with a transcription. Additionally, the training data may have a spectrogram representing the sound waves associated with the audio file.

In some embodiments, an automatic speech recognition system has generated feature vectors for the training data.

At step 304, a soft label is generated by teacher model 104 for the training data. In some embodiments, teacher model 104 can generate a soft label for training data, a soft label is the probability prediction for training data which places a word or word segment in a specific class for which the teacher model is designed to classify. In some embodiments, teacher model 104 can also be configured to generate a hard label for the training data.

At step 306, extract a similar soft label from soft label pool 108 with alternate soft label identification engine 106. For example, alternate soft label identification engine 106 can receive the soft label generated by teacher model 104 and associated the training data. Reference label search module 202 can search for candidate soft labels within soft label pool 108, based on the reference label associated with the training data. In some embodiments, a target word can be isolated within the training data reference label for further refinement. In another example, similarity extraction module 204 can analyze the identified candidate soft labels, based on the speech data of associated with the soft labels. The speech data can be force aligned to the speech data of the generated soft target based on a target word. In some embodiments, the phoneme sequence of the speech data for the candidate soft label can be analyzed against the phoneme sequence of the speech data for the generated soft label. In some embodiments, a similarity score can be generated by similarity extraction module 204 for each identified candidate soft label. Further, if a candidate soft label is identified above a threshold similarity score, the candidate soft label can be sent to student model 114 for training. In some embodiments, one or more similar soft labels can be sent to student model 114 for training, based on the configuration of alternate soft label identification engine 106.

At step 308, student model 114 is trained with the soft label generated by teacher model 104 and the similar soft label identified by alternate soft label identification engine 106. In some embodiments, more than one similar soft label can be used to train student model 114.

Figure 4:
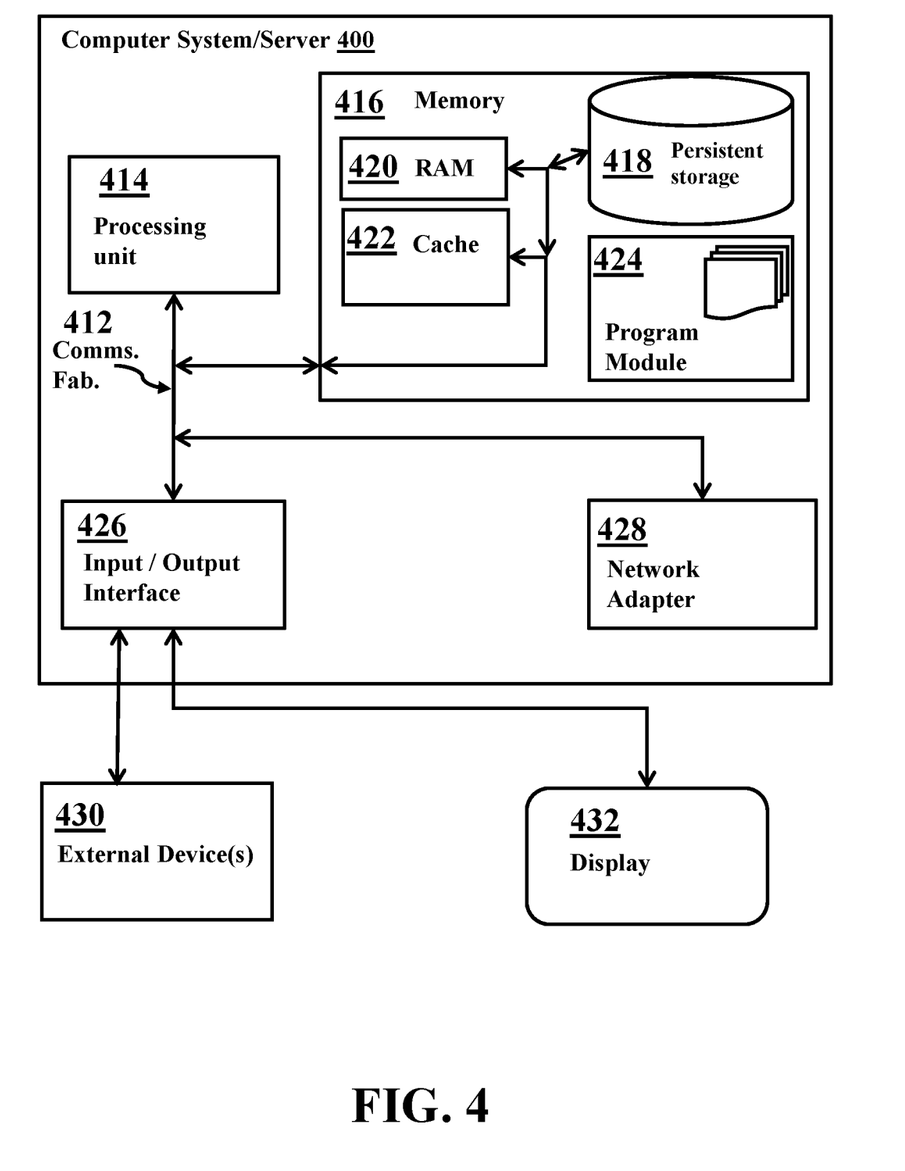
FIG. 4 is a functional block diagram of an exemplary computing system within a code refactor naming environment, in accordance with an embodiment of the present invention.

FIG. 4 depicts computer system 400, an example computer system representative of servers 102 and 112 or any other computing device within an embodiment of the invention. Computer system 400 includes communications fabric 412, which provides communications between computer processor(s) 414, memory 416, persistent storage 418, network adaptor 428, and input/output (I/O) interface(s) 426. Communications fabric 412 can be implemented with any architecture designed for passing data and/or control information between processors (such as microprocessors, communications and network processors, etc.), system memory, peripheral devices, and any other hardware components within a system. For example, communications fabric 412 can be implemented with one or more buses.

Computer system 400 includes processors 414, cache 422, memory 416, network adaptor 428, input/output (I/O) interface(s) 426 and communications fabric 412. Communications fabric 412 provides communications between cache 422, memory 416, persistent storage 418, network adaptor 428, and input/output (I/O) interface(s) 426. Communications fabric 412 can be implemented with any architecture designed for passing data and/or control information between processors (such as microprocessors, communications and network processors, etc.), system memory, peripheral devices, and any other hardware components within a system. For example, communications fabric 412 can be implemented with one or more buses or a crossbar switch.

Memory 416 and persistent storage 418 are computer readable storage media. In this embodiment, memory 416 includes persistent storage 418, random access memory (RAM) 420, cache 422 and program module 424. In general, memory 416 can include any suitable volatile or non-volatile computer readable storage media. Cache 422 is a fast memory that enhances the performance of processors 414 by holding recently accessed data, and data near recently accessed data, from memory 416. As will be further depicted and described below, memory 416 may include at least one of program module 424 that is configured to carry out the functions of embodiments of the invention.

The program/utility, having at least one program module 424, may be stored in memory 416 by way of example, and not limiting, as well as an operating system, one or more application programs, other program modules, and program data. Each of the operating systems, one or more application programs, other program modules, and program data or some combination thereof, may include an implementation of a networking environment. Program module 424 generally carries out the functions and/or methodologies of embodiments of the invention, as described herein.

Program instructions and data used to practice embodiments of the present invention may be stored in persistent storage 418 and in memory 416 for execution by one or more of the respective processors 414 via cache 422. In an embodiment, persistent storage 418 includes a magnetic hard disk drive. Alternatively, or in addition to a magnetic hard disk drive, persistent storage 418 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Network adaptor 428, in these examples, provides for communications with other data processing systems or devices. In these examples, network adaptor 428 includes one or more network interface cards. Network adaptor 428 may provide communications through the use of either or both physical and wireless communications links. Program instructions and data used to practice embodiments of the present invention may be downloaded to persistent storage 418 through network adaptor 428.

I/O interface(s) 426 allows for input and output of data with other devices that may be connected to each computer system. For example, I/O interface 426 may provide a connection to external devices 430 such as a keyboard, keypad, a touch screen, and/or some other suitable input device. External devices 430 can also include portable computer readable storage media such as, for example, thumb drives, portable optical or magnetic disks, and memory cards. Software and data used to practice embodiments of the present invention can be stored on such portable computer readable storage media and can be loaded onto persistent storage 418 via I/O interface(s) 426. I/O interface(s) 426 also connect to display 432.

Display 432 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
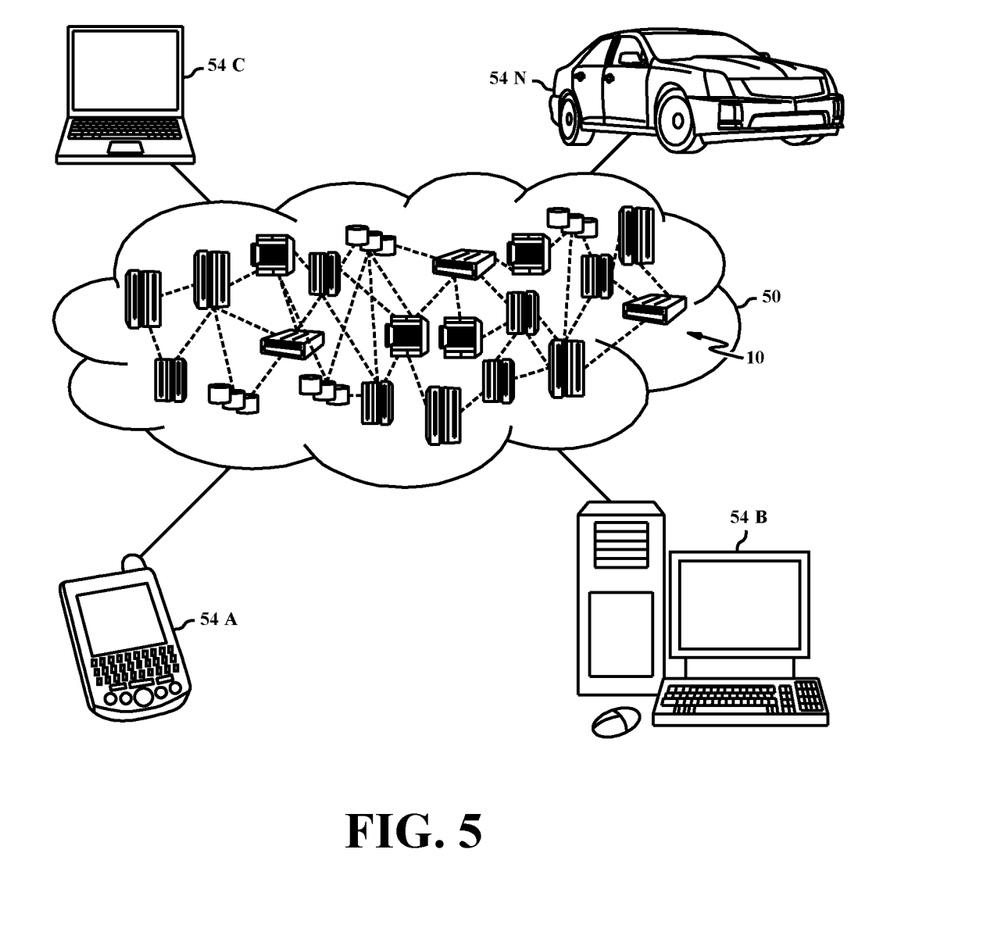
FIG. 5 is a diagram depicting a cloud computing environment, in accordance with an embodiment of the present invention.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
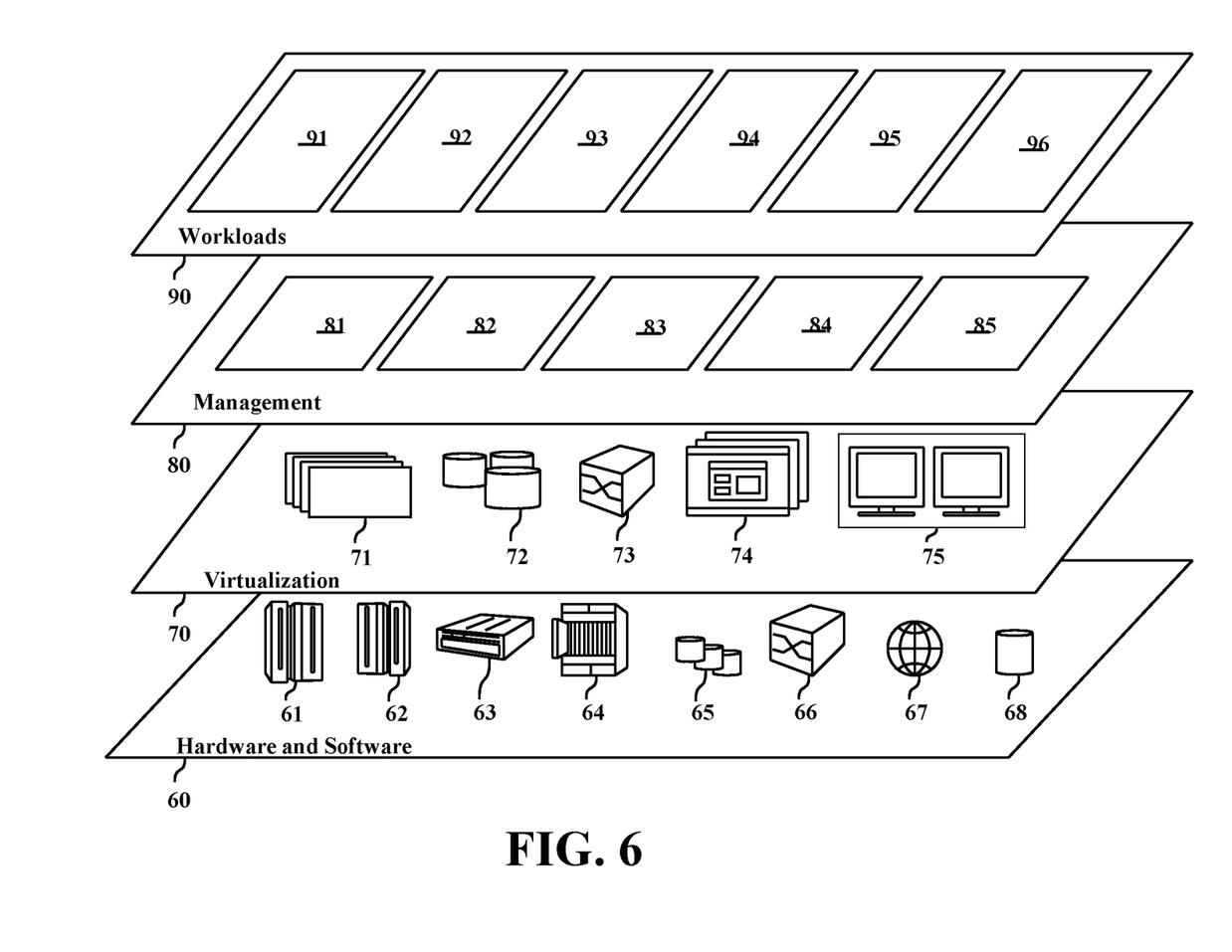
FIG. 6 is a functional block diagram depicting abstraction model layers, in accordance with an embodiment of the present invention.

FIG. 6 is a block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and alternative soft label identification 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for training a student model via knowledge distillation with supplemented labeled training data, the computer-implemented method comprising:

receiving, by one or more processors, an acoustic feature with one or more associated reference labels;

generating, by the one or more processors, a first soft label for the acoustic feature based on a teacher model, wherein the first soft label is a probability prediction for the acoustic feature which places a word or a word segment in a specific class for which the teacher model is designed to classify;

identifying, by the one or more processors, one or more candidate soft labels based on each reference label of the one or more associated reference labels, wherein the identified one or more candidate soft labels are from a soft label pool;

determining, by the one or more processors, if each of the identified one or more candidate soft labels is similar to the acoustic feature, wherein the identified one or more candidate soft labels is similar to the acoustic feature if the identified one or more candidate soft labels has the same sequence of phonemes as the acoustic feature;

generating, by the one or more processors, a similarity score for each of the identified one or more candidate soft labels, wherein the similarity score is generated based on the determination that each of the identified one or more candidate soft labels is similar to the acoustic feature;

determining, by the one or more processors, a second soft label, wherein
the identified one or more candidate soft labels include the second soft label, and
the similarity score of the second soft label is above a specific threshold; and responsive to the determining of the second soft label:
outputting, by the one or more processors, the second soft label;
training, by the one or more processors, the student model using the generated first soft label and the second soft label, wherein the student model is an automatic speech recognition system; and
operating, by the one or more processors, the trained student model as a speech recognition system on a user device.

2. The computer-implemented method of claim 1, further comprising generating the soft label pool by the teacher model.

3. The computer-implemented method of claim 1, further comprising generating, by an acoustic feature generator, the acoustic feature, wherein the acoustic feature generator is a convolutional neural network.

4. The computer-implemented method of claim 1, wherein the teacher model is a visual geometry group model.

5. The computer-implemented method of claim 1, further comprising:
generating, by the one or more processors, a hard label for the acoustic feature; and
training, by the one or more processors, the student model with the hard label.

6. A system for generating labeled training data for a student model, the system comprising:
one or more computer processors; and
one or more computer readable storage media that store computer program instructions, wherein
the one or more computer processors are configured to execute the computer program instructions to:
receive an acoustic feature with one or more associated reference labels;
generate a first soft label for the acoustic feature based on a teacher model, wherein the first soft label is a probability prediction for the acoustic feature which places a word or a word segment in a specific class for which the teacher model is designed to classify;
identify one or more candidate soft labels based on each reference label of the one or more associated reference labels, wherein the identified one or more candidate soft labels are from a soft label pool;
determine if each of the identified one or more candidate soft labels is similar to the acoustic feature, wherein the identified one or more candidate soft labels is similar to the acoustic feature if the identified one or more candidate soft labels has the same sequence of phonemes as the acoustic feature;
generate a similarity score for each of the identified one or more candidate soft labels, wherein the similarity score is generated based on the determination that each of the identified one or more candidate soft labels is similar to the acoustic feature;
determine a second soft label, wherein
the identified one or more candidate soft labels include the second soft label, and
the similarity score of the second soft label is above a specific threshold; and
responsive to the determination of the second soft label:
output the second soft label;
train the student model using the generated first soft label and the second soft label, wherein the student model is an automatic speech recognition system; and
operate the trained student model as a speech recognition system on a user device.

7. The system of claim 6, wherein
the determination if each of the identified one or more candidate soft labels is similar to the acoustic feature further comprises extraction, from the soft label pool, of a first word sequence, and
the extracted first word sequence has the same length as a second word sequence of the acoustic feature at a state level.

8. The system of claim 6, wherein
the determination if each of the identified one or more candidate soft labels is similar to the acoustic feature further comprises extraction, from the soft label pool, of a first phoneme sequence, and
the extracted first phoneme sequence has the same length as a second phoneme sequence of the acoustic feature.

9. The system of claim 6, wherein the one or more computer processors are further configured to execute the computer program instructions to generate feature vectors for a source code of a plurality of functions and a plurality of classes.

10. The system of claim 6, wherein the teacher model is a visual geometry group model.

11. The system of claim 6, wherein the student model is a convolutional neural network.

12. A computer program product for code refactor renaming comprising a computer readable storage medium having program instructions embodied therewith, the program instructions executable by a processor to cause the processors to perform a function, the function comprising:
receive an acoustic feature with one or more associated reference labels;
generate a first soft label for the acoustic feature based on a teacher model, wherein the first soft label is a probability prediction for the acoustic feature which places a word or word segment in a specific class for which the teacher model is designed to classify;
identify one or more candidate soft labels based on each reference label of the one or more associated reference labels, wherein the identified one or more candidate soft labels are from a soft label pool;

determine if each of the identified one or more candidate soft labels is similar to the acoustic feature, wherein the identified one or more candidate soft labels is similar to the acoustic feature if the identified one or more candidate soft labels has the same sequence of phonemes as the acoustic feature;

generate a similarity score for each of the identified one or more candidate soft labels, wherein the similarity score is generated based on the determination that each of the identified one or more candidate soft labels is similar to the acoustic feature;

determine a second soft label, wherein
the identified one or more candidate soft labels include the second soft label, and
the similarity score of the second soft label is above a specific threshold; and responsive to the determination of the second soft label:
output the second soft label;
train a student model using the generated first soft label and the second soft label, wherein the student model is an automatic speech recognition system; and
operate the trained student model as a speech recognition system on a user device.

13. The computer program product of claim 12, wherein
the determination if each of the identified one or more candidate soft labels is similar to the acoustic feature includes extraction, from the soft label pool, of a first word sequence, and
the extracted first word sequence has the same length as a second word sequence of the acoustic feature at a state level.

14. The computer program product of claim 12, wherein
the determination if each of the identified one or more candidate soft labels is similar to the acoustic feature includes extraction, from the soft label pool, of a first phoneme sequence, and
the extracted first phoneme sequence has the same length as a second phoneme sequence of the acoustic feature.

15. The computer program product of claim 12, wherein the teacher model is a visual geometry group model.

16. The computer program product of claim 12, wherein the student model is a convolutional neural network.

* * * * *